(12) United States Patent
Hightower (10) Patent No.: US 12,204,399 B1
(45) Date of Patent: Jan. 21, 2025

(54) REVISE ANIMATION CONTROL PROGRAM (TAC)

(71) Applicant: Paul Hightower, Philadelphia, PA (US)

(72) Inventor: Paul Hightower, Philadelphia, PA (US)

( * ) Notice: Subject to any disclaimer, the term of this patent is extended or adjusted under 35 U.S.C. 154(b) by 0 days.

(21) Appl. No.: 18/757,010

(22) Filed: Jun. 27, 2024

(51) Int. Cl.
*G06F 11/07* (2006.01)
*G06F 21/32* (2013.01)
*G06F 21/57* (2013.01)

(52) U.S. Cl.
CPC ........ *G06F 11/079* (2013.01); *G06F 11/0709* (2013.01); *G06F 11/0793* (2013.01); *G06F 21/32* (2013.01); *G06F 21/57* (2013.01); *G06F 2221/034* (2013.01)

(58) Field of Classification Search
CPC .............. G06F 11/079; G06F 11/0709; G06F 11/0793; G06F 21/32; G06F 21/57; G06F 2221/034
See application file for complete search history.

(56) References Cited

U.S. PATENT DOCUMENTS

| | | | | |
|---|---|---|---|---|
| 8,018,860 B1* | 9/2011 | Cook | ................ | H04L 41/145 |
| | | | | 370/242 |
| 8,973,133 B1* | 3/2015 | Cooley | ................ | G06F 21/50 |
| | | | | 726/22 |
| 9,038,180 B2* | 5/2015 | Neil | ................ | H04L 63/1433 |
| | | | | 726/25 |
| 9,439,081 B1* | 9/2016 | Knebl | ................ | G06N 20/00 |
| 9,472,084 B1* | 10/2016 | Barak | ................ | G08B 21/187 |
| 9,594,624 B2* | 3/2017 | Charters | ................ | G06F 11/1433 |
| 9,612,896 B1* | 4/2017 | Traylor | ................ | G06F 11/076 |
| 10,048,996 B1* | 8/2018 | Bell | ................ | G06F 11/3006 |
| 10,050,987 B1* | 8/2018 | Mohta | ................ | H04W 12/12 |
| 10,268,709 B1* | 4/2019 | Suehs | ................ | G06F 16/211 |
| 10,353,764 B1* | 7/2019 | Cazzanti | ................ | H04L 41/147 |
| 10,642,719 B1* | 5/2020 | Balasubramanian | .. | G06N 5/022 |
| 10,691,528 B1* | 6/2020 | Ferreira | ................ | G06F 11/0709 |
| 10,747,544 B1* | 8/2020 | Balasubramanian | ................ | |
| | | | | G06F 11/0709 |
| 10,771,489 B1* | 9/2020 | Bisht | ................ | G06N 20/00 |
| 10,970,183 B1* | 4/2021 | Aberg | ................ | G06F 11/321 |
| 11,012,454 B1* | 5/2021 | Han | ................ | H04L 63/1425 |
| 11,113,144 B1* | 9/2021 | Gadepalli | ................ | G06N 3/08 |
| 11,126,486 B2* | 9/2021 | Ganesan | ................ | G06F 11/3006 |
| 11,200,137 B1* | 12/2021 | Serita | ................ | G06F 11/3089 |
| 11,457,031 B1* | 9/2022 | Bisht | ................ | H04L 63/1416 |
| 11,552,975 B1* | 1/2023 | Zhang | ................ | H04L 67/125 |

(Continued)

FOREIGN PATENT DOCUMENTS

| | | | |
|---|---|---|---|
| CN | 111786949 A | 10/2020 | |
| CN | 108933791 B | 2/2021 | |

(Continued)

*Primary Examiner* — Aravind K Moorthy (57) ABSTRACT

The present invention, Revise Animation Control (TAC) Program, is an advanced AI-driven system that monitors, troubleshoots, and repairs computer systems using a suite of learning algorithms and a 3D avatar interface. The present invention includes robust security protocols, dynamic updates, and energy-efficient modes, ensuring continuous and autonomous system maintenance and optimization. With comprehensive antivirus protection and advanced authentication methods, the present invention safeguards the computer system and enhances the user experience.

20 Claims, 7 Drawing Sheets

(56) References Cited

U.S. PATENT DOCUMENTS

| | | | |
|---|---|---|---|
| 11,636,004 B1* | 4/2023 | Ni | G06F 18/214 |
| | | | 714/37 |
| 12,013,824 B1* | 6/2024 | Reeves | G06F 11/302 |
| 12,057,993 B1* | 8/2024 | Zafer | H04L 41/0654 |
| 12,086,024 B2* | 9/2024 | Yang | G06F 11/0751 |
| 2004/0117153 A1* | 6/2004 | Siegel | H04L 41/147 |
| | | | 702/183 |
| 2006/0153089 A1* | 7/2006 | Silverman | H04L 43/10 |
| | | | 370/252 |
| 2006/0195745 A1* | 8/2006 | Keromytis | G06F 11/0742 |
| | | | 714/741 |
| 2006/0259274 A1* | 11/2006 | Greco | G06F 11/3485 |
| | | | 702/182 |
| 2007/0055914 A1* | 3/2007 | Chandwani | G06F 11/0715 |
| | | | 714/E11.02 |
| 2008/0021883 A1* | 1/2008 | Alstrin | H04L 43/0817 |
| 2009/0204382 A1* | 8/2009 | Tung | G06F 1/3203 |
| | | | 703/21 |
| 2014/0122546 A1* | 5/2014 | Liao | G06F 9/5027 |
| | | | 707/827 |
| 2014/0281713 A1* | 9/2014 | Hampapur | G06N 7/01 |
| | | | 714/26 |
| 2014/0372091 A1* | 12/2014 | Larimore | G06F 30/20 |
| | | | 703/2 |
| 2015/0199223 A1* | 7/2015 | Banerjee | G06F 11/076 |
| | | | 714/47.2 |
| 2015/0339414 A1* | 11/2015 | Kuo | G06F 17/18 |
| | | | 716/103 |
| 2016/0266962 A1* | 9/2016 | Rajasekharan | G06F 9/5072 |
| 2016/0269436 A1* | 9/2016 | Danielson | H04L 63/1433 |
| 2016/0300049 A1* | 10/2016 | Guedalia | G06V 30/1985 |
| 2017/0052814 A1* | 2/2017 | Aguiar | G06F 11/0709 |
| 2017/0083822 A1* | 3/2017 | Adendorff | G06F 11/0793 |
| 2017/0249234 A1* | 8/2017 | Kalech | G06F 11/0793 |
| 2017/0300018 A1* | 10/2017 | Block | G05B 19/4065 |
| 2017/0364402 A1* | 12/2017 | Chua | G06F 11/076 |
| 2018/0032405 A1* | 2/2018 | Chen | G06F 11/1451 |
| 2018/0197092 A1* | 7/2018 | Acar | G05B 19/41875 |
| 2019/0087249 A1* | 3/2019 | Togawa | H04N 1/00718 |
| 2019/0095265 A1* | 3/2019 | Dome | G06F 11/3006 |
| 2019/0155271 A1* | 5/2019 | Matthews | G05B 15/02 |
| 2019/0163666 A1* | 5/2019 | Cakmak | G06N 5/02 |
| 2019/0340392 A1* | 11/2019 | Khorrami | G06F 21/71 |
| 2019/0342308 A1* | 11/2019 | Chai | H04L 63/1425 |
| 2019/0361784 A1* | 11/2019 | Savanur | G06F 11/3034 |
| 2019/0377625 A1* | 12/2019 | Chintalapati | G06N 7/01 |
| 2019/0384257 A1* | 12/2019 | Zhang | G06F 11/008 |
| 2020/0089558 A1* | 3/2020 | Stankevichus | G06F 11/3447 |
| 2020/0097347 A1* | 3/2020 | Mahindru | G06F 11/076 |
| 2020/0097348 A1* | 3/2020 | Mahindru | G06F 11/008 |
| 2020/0118665 A1* | 4/2020 | Bender | G16H 50/30 |
| 2020/0133758 A1* | 4/2020 | Liu | G06F 3/0689 |
| 2020/0137094 A1* | 4/2020 | Janakiraman | G06N 20/00 |
| 2020/0152328 A1* | 5/2020 | Bender | G06N 20/00 |
| 2020/0167259 A1* | 5/2020 | Cannata | G06F 11/3452 |
| 2020/0220892 A1* | 7/2020 | Gibson | H04L 63/1441 |
| 2020/0293657 A1* | 9/2020 | Chai | G06F 11/3452 |
| 2020/0371509 A1* | 11/2020 | Mark | G05B 19/4183 |
| 2021/0064456 A1* | 3/2021 | Shetty | G06F 11/008 |
| 2021/0184916 A1* | 6/2021 | Ramanujan | G06F 11/0793 |
| 2021/0304061 A1* | 9/2021 | Kolar | G06F 11/3447 |
| 2021/0342204 A1* | 11/2021 | Choudhury | G06F 11/004 |
| 2021/0357282 A1* | 11/2021 | Verma | G06N 3/044 |
| 2021/0374568 A1* | 12/2021 | Vishwakarma | G06F 11/008 |
| 2021/0383706 A1* | 12/2021 | Gibbons, II | G08G 5/0013 |
| 2021/0389894 A1* | 12/2021 | Zhou | G06F 3/067 |
| 2021/0406727 A1* | 12/2021 | Wang | G06N 5/04 |
| 2022/0004429 A1* | 1/2022 | Bhamidipaty | G06F 18/24 |
| 2022/0027199 A1* | 1/2022 | Desikachari | G06F 9/5011 |
| 2022/0029902 A1* | 1/2022 | Shemer | H04L 41/0686 |
| 2022/0043703 A1* | 2/2022 | Hwang | G06T 11/206 |
| 2022/0058099 A1* | 2/2022 | Damera Venkata | |
| | | | G06F 11/3409 |
| 2022/0067460 A1* | 3/2022 | Raj | G06N 20/00 |
| 2022/0091923 A1* | 3/2022 | O'Toole | G06N 7/01 |
| 2022/0253522 A1* | 8/2022 | Yang | G06N 5/04 |
| 2022/0345475 A1* | 10/2022 | Otto | H04L 63/1416 |
| 2023/0018199 A1* | 1/2023 | Mahamuni | G06F 11/3051 |
| 2023/0044470 A1* | 2/2023 | Singla | G06F 18/214 |
| 2023/0055527 A1* | 2/2023 | Majithia | G06F 11/0772 |
| 2023/0069498 A1* | 3/2023 | Wiranata | G06F 11/079 |
| 2023/0087336 A1* | 3/2023 | Hadlock | G06F 11/008 |
| | | | 714/47.3 |
| 2023/0095870 A1* | 3/2023 | Du | H04L 63/1416 |
| | | | 726/23 |
| 2023/0116207 A1* | 4/2023 | Paduvalli | H04W 12/08 |
| | | | 726/2 |
| 2023/0153191 A1* | 5/2023 | Gennetten | G06F 11/0772 |
| | | | 714/57 |
| 2023/0153223 A1* | 5/2023 | Sankaranarayanan | |
| | | | G06F 11/3006 |
| | | | 714/48 |
| 2023/0177152 A1* | 6/2023 | Lee | G06F 21/552 |
| | | | 726/23 |
| 2023/0188408 A1* | 6/2023 | Pick | H04L 41/0627 |
| | | | 709/224 |
| 2023/0195558 A1* | 6/2023 | Purushothaman | G06N 20/20 |
| | | | 714/15 |
| 2023/0208869 A1* | 6/2023 | Bisht | G06N 7/01 |
| | | | 726/23 |
| 2023/0229220 A1* | 7/2023 | Suryanarayana | G06F 1/30 |
| | | | 714/14 |
| 2023/0231860 A1* | 7/2023 | Tian | G06N 5/022 |
| | | | 726/1 |
| 2023/0289327 A1* | 9/2023 | Patel | G06F 11/2097 |
| 2023/0396511 A1* | 12/2023 | Zhou | G06F 11/2263 |
| 2023/0396512 A1* | 12/2023 | Malleshaiah | H04Q 9/00 |
| 2023/0409412 A1* | 12/2023 | Kruegel | G06F 9/541 |
| 2023/0418722 A1* | 12/2023 | Aird | G06F 11/3664 |
| 2024/0005177 A1* | 1/2024 | Singh | G06N 3/09 |
| 2024/0005199 A1* | 1/2024 | Butvinik | G06Q 40/02 |
| 2024/0073107 A1* | 2/2024 | Kochiev | H04L 41/5009 |
| 2024/0089277 A1* | 3/2024 | Friedlander | H04L 43/022 |
| 2024/0103959 A1* | 3/2024 | Murali | G06F 11/008 |
| 2024/0135242 A1* | 4/2024 | Yogaraj | G06N 3/042 |
| 2024/0143993 A1* | 5/2024 | Schneuwly | G06N 3/08 |
| 2024/0256945 A1* | 8/2024 | Mantravadi | G06N 7/01 |
| 2024/0267239 A1* | 8/2024 | Zoldi | H04L 9/50 |
| 2024/0281522 A1* | 8/2024 | Kuo | G06N 3/08 |
| 2024/0281661 A1* | 8/2024 | Gottin | G06N 3/088 |

FOREIGN PATENT DOCUMENTS

| | | |
|---|---|---|
| CN | 113961939 B | 1/2022 |
| CN | 110795917 B | 10/2023 |
| EP | 3002648 B1 | 6/2021 |

* cited by examiner

REVISE ANIMATION CONTROL PROGRAM (TAC)

FIELD OF THE INVENTION

The present invention generally relates to the field of computer systems maintenance and security. More specifically, the present invention relates to a computer program designed to monitor, troubleshoot, and repair computer systems by utilizing an advanced learning algorithm and a 3D Avatar interface.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention, called the Revise Animation Control (TAC) Program, is an advanced, adaptive AI-driven system that leverages deep machine learning to monitor, troubleshoot, and repair computer systems. TAC employs a suite of algorithms for supervision, training, prediction, and reasoning to provide a comprehensive virtual assistant experience. It includes robust security measures, such as antivirus protection, and uses advanced authentication methods, including face scans, finger print and voice recognition, to prevent unauthorized access.

BACKGROUND OF THE INVENTION

There is a growing demand for a computer program that monitors, troubleshoots, and repairs computer systems through an advanced learning algorithm and a 3D avatar interface.

Modern computer systems face numerous vulnerabilities such as viruses, malware, and unauthorized access. These vulnerabilities pose serious threats to the smooth operation and security of both personal and organizational data. Current solutions, including antivirus programs and system optimization tools, present several significant issues.

Firstly, traditional antivirus and optimization tools often necessitate manual intervention, requiring users to initiate scans, apply fixes, and manage updates. This manual approach can be time-consuming and may lead to human errors. Secondly, existing tools are not always adaptive to new and emerging threats. As cyber threats evolve rapidly, static and non-learning-based systems become inefficient and may fail to protect against the latest vulnerabilities.

Additionally, current solutions typically lack robust learning mechanisms. They do not continuously learn from new data or user behaviors, limiting their ability to improve and respond effectively to new challenges. Many existing tools also have complex interfaces that can be difficult for non-technical users to navigate, leading to poor user engagement and potentially inadequate security practices.

The present invention is intended to solve the problems associated with conventional devices and methods and provide improvements on these devices.

DETAIL DESCRIPTIONS OF THE INVENTION

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list." The following detailed description refers to the accompanying drawings.

Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for monitoring, troubleshooting, and repairing computer systems, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a creator, fans thereof. Further, the user as defined herein may refer to a human, an animal, or an artificially intelligent being in any state of existence, unless stated otherwise, elsewhere in the present disclosure.

Figure 1:
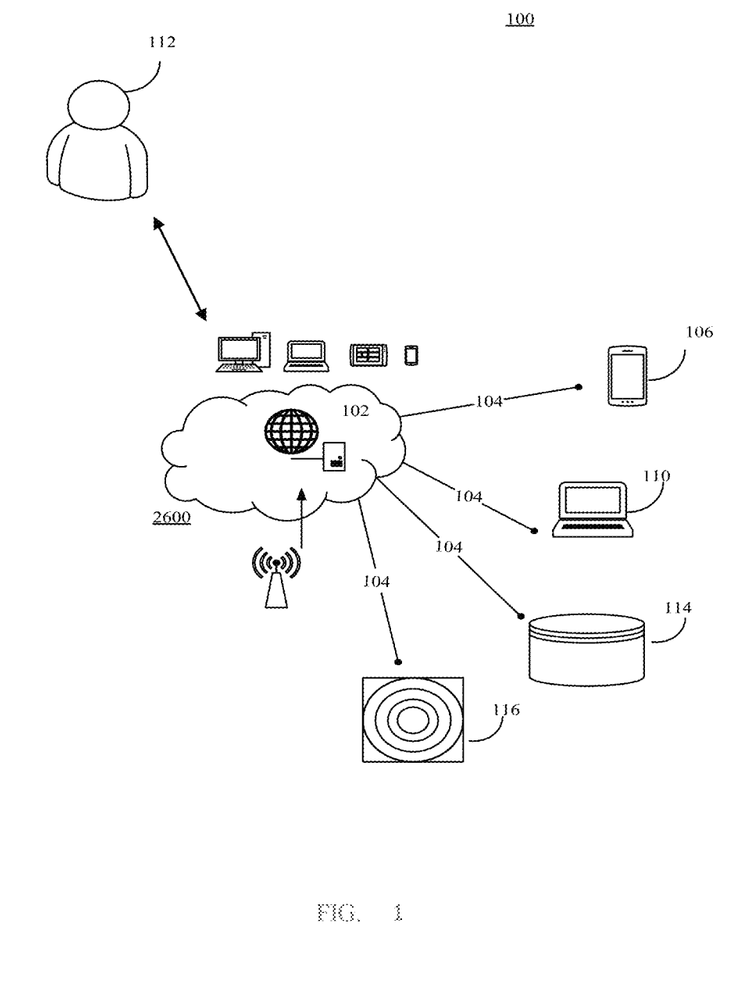
FIG. 1 is an illustration of an online platform consistent with various embodiments of the present disclosure.
Figure 2:
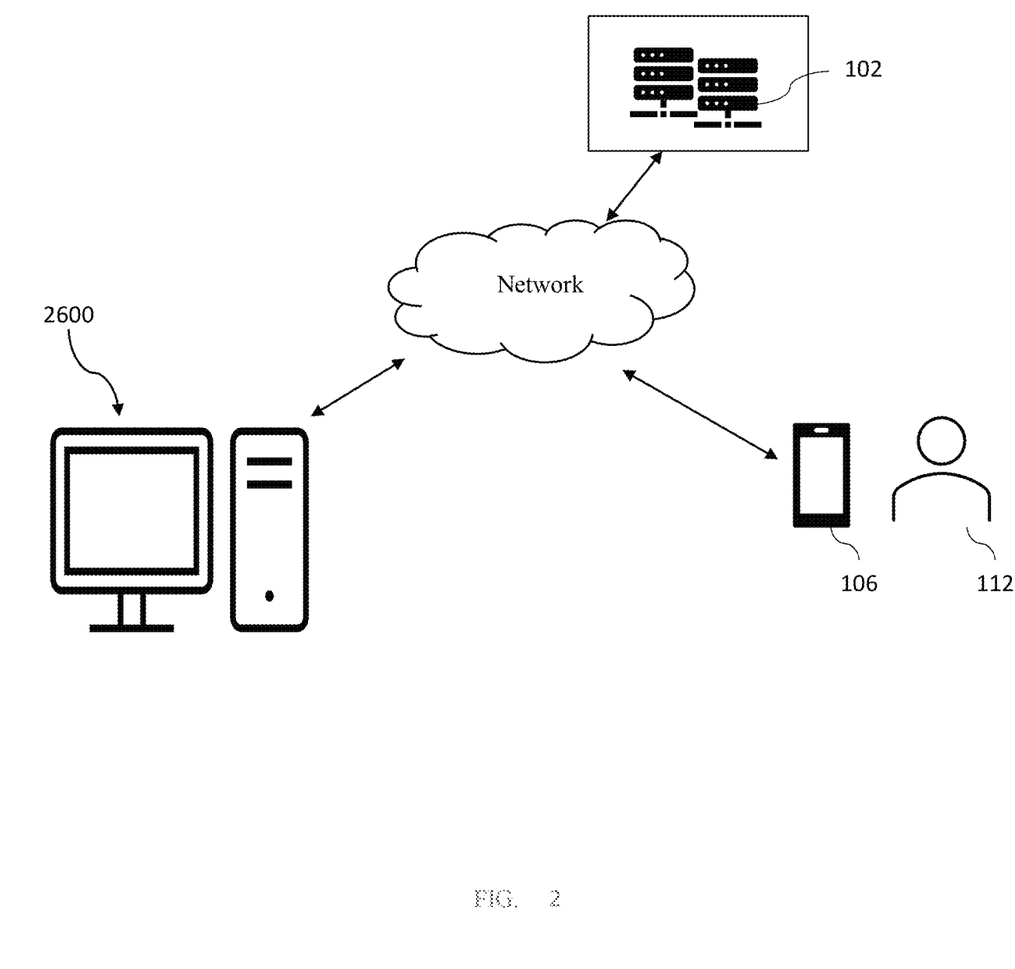
FIG. 2 is an illustration of one embodiment of the present invention installed on a server and connected to the computing device.

FIG. 1 is an illustration of an online platform 100 consistent with various embodiments of the present disclosure. By way of non-limiting example, the online platform 100 to facilitate processes of the present invention may be hosted on a centralized server 102, as shown in FIG. 2, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, the databases 114 may be associated with government agencies. Further, users of the online platform 100 may include relevant parties such as, but not limited to, end-users, administrators, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2600.

Figure 3:
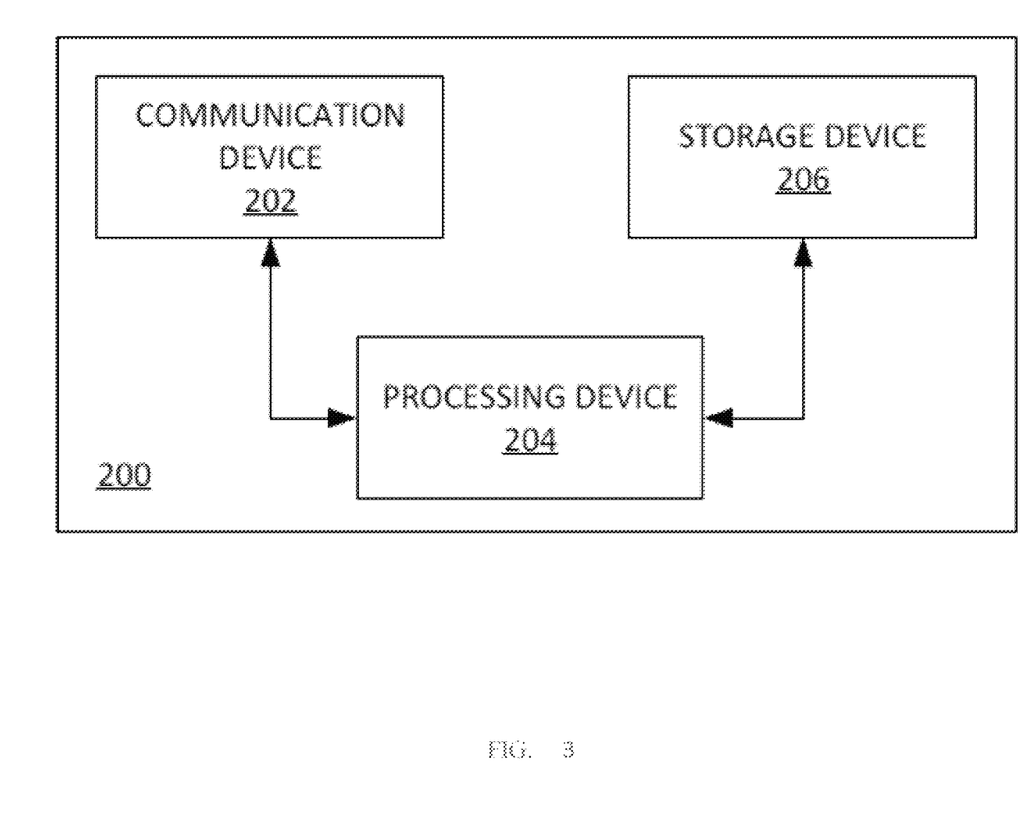
FIG. 3 is a block diagram of a system in accordance with some embodiments.

FIG. 3 is a block diagram of a system 200 for facilitating present invention, in accordance with some embodiments. Accordingly, the system 200 may include a communication device 202, a processing device 204, and a storage device 206. These devices 202, 204, and 206 will be further explained in detail below.

The present invention, TAC, learns from diverse data sources, including the internet, videos, and television, to continuously update and enhance its knowledge base.

The present invention autonomously maintains the computer system by managing utilities, applications, and system updates. The present invention proactively identifies and resolves issues to prevent system crashes and ensures efficient operation.

The present invention includes a 3D avatar interface, which enhances the user experience by providing an intuitive and interactive way to manage the health and security of computer systems. The embedded advanced learning algorithms enable the program to monitor, detect, and rectify issues in real-time, improving system performance and security autonomously.

The present invention represents a significant advancement in computer system maintenance and security. The present invention provides a proactive, user-friendly solution designed to safeguard against a wide array of vulnerabilities and evolving threats.

Figure 4:
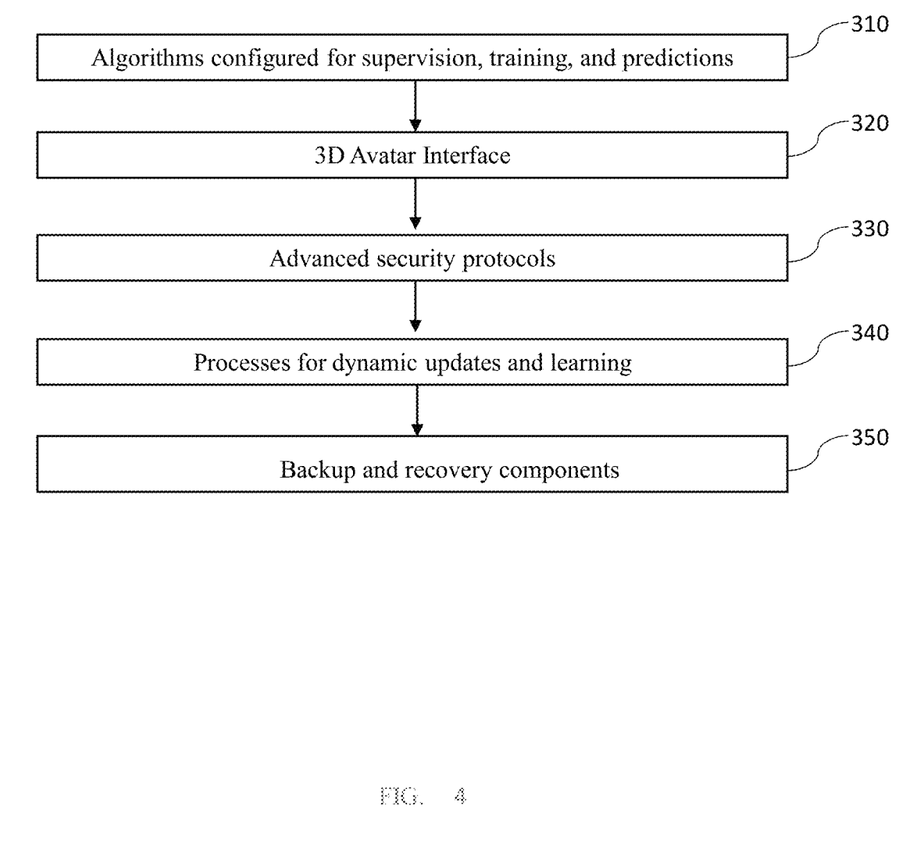
FIG. 4 is an illustration of one embodiment of components of the present invention.

As shown in FIG. 4, the present invention comprises a plurality of algorithms 310 configured for supervision, training, and predictions, a 3D Avatar Interface 320, advanced security protocols 330, a plurality of processes for dynamic updates and learning 340, one or more backup and recovery components 350.

Algorithms Configured for Supervision, Training, and Predictions 310

The Supervision, Training, and Predictive Algorithms constitute the backbone of the program, enabling it to comprehend and incorporate new data, thereby enhancing its operational efficacy. These algorithms facilitate the continuous improvement of the program's functionality by utilizing advanced machine learning techniques to interpret and integrate incoming data.

3D Avatar Interface 320

The present invention incorporates a 3D Avatar Interface that furnishes an interactive user experience via speech recognition and synthesized voices. This interface is designed to provide a more engaging and intuitive interaction for users, enhancing the overall usability of the program.

Advanced Security Protocols 330

Included within the present invention are advanced security protocols that utilize facial scans, voice recognition, finger print and ID numbers for user authentication and access restriction. These protocols are specifically designed to ensure secure access and protect the system from unauthorized use.

Processes for Dynamic Updates and Learning 340

The present invention also features dynamic updates and learning processes. This functionality is configured to regularly update the virus definition database, ensuring that the system can adapt to and counteract emerging threats. The continuous learning process enables the system to evolve and maintain its effectiveness against new and evolving cybersecurity threats.

Backup and Recovery Components 350

Furthermore, the present invention includes a backup and recovery component that ensures data integrity and facilitates expedient recovery in the event of system failure. This component is crucial for maintaining the reliability of the system, providing a mechanism for quick restoration of functionality and data integrity in case of unforeseen issues.

Each of these components collectively contributes to the robustness and advanced capabilities of the present invention, ensuring its effectiveness and reliability in various operational contexts.

In some embodiments, the present invention may further comprises several operational features:
Proactive Security and Maintenance: This feature can be configured to automatically scan documents and websites to ensure safety and security.
Energy Efficiency: The system may incorporate mechanisms to enter sleep mode and initiate shutdown after periods of inactivity, thereby conserving energy.
Customization: The method and system of the present invention may allow users to add additional primary users with specified permissions through an approval process, facilitating tailored user access control.
Human-like Interaction: The method and system of the present invention can be designed to mimic user voices and images, providing a personalized and interactive user experience.

In some other embodiments, the present invention may also include applications for the following functions:
Educational Assistance: The system provides tutoring on a variety of subjects by aggregating information from reliable sources, thereby enhancing the learning experience.
System Optimization: This function ensures the smooth operation of the computer by diagnosing and rectifying issues, thereby maintaining optimal performance.
Enhanced Security Measures: The invention includes integrated anti-malware and antivirus programs that automatically update themselves, maintaining vigilance against potential threats.
User Monitoring and Control: This application restricts access to harmful areas of the internet, thereby safeguarding users against potential dangers.

In one embodiment, the present invention can be implemented as follows:
Initial Setup: The invention is first installed on a new computer to map and familiarize itself with the system's functionality.
Continuous Learning: The system enhances its capabilities through regular updates and the integration of new data.
File Management: The invention organizes and maintains records of all installed utilities, programs, and applications.
Security Enhancements:
    Access Control: The system employs multiple layers of security to ensure authorized usage only, including face scans, finger print and voice recognition.
    Automatic Data Cleanses: Post-session, the system removes traces of activity to maintain privacy and security.
    Override Functionality: The system allows at least two primary users to override system restrictions using their credentials.

In some embodiments, the present invention may include additional features as follows:
Incorporation of Webster Dictionary and Drafting Capabilities (the TAC Program Will Learn from the Webster Dictionary and the Drafting Program on it Own about Robot)

The TAC program can be designed to include a preprogrammed Webster dictionary and drafting functionalities within its application software. This integration allows for enhanced user experience by providing immediate access to vocabulary and drafting tools. The program is capable of automatically training online through the TAC learning module. Leveraging its advanced algorithms and voice recognition technology, the TAC program can autonomously study from free educational resources, such as school and college courses, available via the new TAC Improvement Application. This educational feature becomes accessible once the TAC has completed its essential computer safety functions. In addition, the TAC program dedicates time to its AI antivirus application. Both functionalities work in tandem to answer user queries by searching the internet for accurate information to pass various tests. The UnSupervised Algorithms within the TAC will function independently to automatically search for answers that are unknown to the TAC program, thereby enhancing its knowledge base through integrated learning modalities.

Integration with AI Antivirus Application

The TAC program may incorporate an AI antivirus application designed to scan every accessible free training and college site for potential viruses. This integration ensures that the TAC becomes increasingly intelligent and innovative with each correct query response. The AI-powered antivirus employs non-supervised algorithms, machine learning, behavior analytics, and anomaly detection to train itself. Continuous exposure to an extensive dataset of viruses and hacker information enables the TAC program and its antivirus component to develop an inherent understanding of threat detection and mitigation strategies. This approach allows TAC to autonomously improve its functionality, ensuring comprehensive protection against evolving cybersecurity threats.

Pre-Coded Firewall Comprehension

The TAC startup program can be pre-coded to understand various computer firewall functions, allowing it to select and implement the most appropriate firewalls for comprehensive system protection. Upon initial operation, the program continues to learn and update its firewall systems by notifying users of the most effective firewall options available. During training, the TAC program dedicates effort to safeguarding against hackers, malware, and other types of viruses. To enhance security, the program includes fingerprint recognition features, ensuring that only authorized users can access critical firewall settings and other sensitive functions.

Secure Update Mechanism

The TAC program can be equipped with a unique code, 1953/919, which is essential for incorporating new functionalities. This code allows the rightful purchaser to upload new program codes to the TAC software application, effectively merging new software components with the existing system. Entering the pre-programmed code 1953/919 initiates the TAC-2, which completes and integrates new functions seamlessly. Although this advanced system application is yet to be fully implemented, it holds the potential to revolutionize how TAC operates, enhancing user capabilities and overall program efficiency.

Highlighting and Selective Printing Capability

The TAC program may include a sophisticated highlighting feature designed to facilitate selective printing. Users can highlight sections of text numerically (e.g., 1 for the first section, 2 for the second) to prompt the printer to print only the highlighted segments. This capability makes writing and printing more efficient by ensuring that only essential information is processed for print. For example:

(1) AI training involves three primary steps:
  The first step, training, consists of feeding data into a computer algorithm to generate predictions and evaluate their accuracy.
  The second step, validating, assesses the performance of the trained model on unseen data.
  The final step, testing, determines the model's prediction accuracy on entirely new data.

This numerical labeling system allows users to focus on pertinent information, significantly optimizing the printing process by reducing unnecessary output and saving resources.

Artificial Intelligence (AI)

Artificial Intelligence, commonly abbreviated as AI, refers to the field dedicated to creating systems that can perform tasks which normally require human intelligence. Within AI, there is a subfield known as machine learning. Machine learning focuses on creating algorithms that enable machines to learn from data and experiences, improving their ability to perform specific tasks over time.

A key component of machine learning is the artificial neural network (ANN). An ANN is a model inspired by the human brain. It consists of artificial neurons, also called nodes, which are interconnected through synapses. This network structure allows the ANN to solve complex problems. The effectiveness of an ANN depends on its structure, the learning process for updating the network's parameters, and the activation functions that generate its output values.

An ANN typically consists of several layers: an input layer, an output layer, and, in many cases, one or more hidden layers. Each layer includes multiple neurons. Synapses link these neurons, enabling them to communicate. When a neuron receives input signals, it processes these signals by applying weights and biases. Then, it uses an activation function to produce an output.

The model parameters are the values, such as weights and biases, that the ANN learns and adjusts during the training process. Hyperparameters, on the other hand, are settings defined before the training begins. These include the learning rate, the number of training iterations, the size of data batches used in training, and the initialization methods.

The purpose of training an artificial neural network is to determine the best model parameters that minimize a loss function. The loss function serves as a metric to evaluate the performance of the network, guiding it toward optimizing its parameters.

Machine learning techniques can be classified into three main types based on the learning method: supervised learning, unsupervised learning, and reinforcement learning. In supervised learning, the ANN is trained using labeled data, which means the correct answers are provided. Unsupervised learning involves training the ANN with unlabeled data, so it has to identify patterns and structures by itself. Reinforcement learning is a process where an agent learns to take actions in an environment to maximize cumulative rewards. Deep learning is a more advanced subset of machine learning that uses deep neural networks (DNNs) with multiple hidden layers. For the purposes of clarity in this document, the term "machine learning" will be used to refer specifically to deep learning.

The communication device 202 of the present invention may be configured to obtain information regarding a computing device 202 and the surrounding environment. The present invention may utilize this information to operate the computing device 2600 according to an operation feature or to assist a user in operating the computing device 2600. To monitor the computing device 2600, the communication device 202 of the present invention may include one or more sensors that can be installed within the computing device 2600 and communicate with the processing device 204 of the present invention. The present invention may further process the sensor data using the processing device 204 to determine when the computing device 2600 is in operation and information regarding the computing device 2600.

In some embodiments, the communication device 202 may communicate with the processing device 204 via a network. The communication device 202 may communicate with the processing device 204 via the network to allow the storage device 206 to record information regarding computing device usage. The storage device 206 may use one or more servers to receive data from the communication device 202 or the processing device 204, store the received data, process the received data, and/or communicate information associated with the received or processed data.

The communication device (e.g., sensors) 202 may be disposed within or communicatively connected to one or more processing device 204, which may be permanently or removably installed in the computing device 2600. The processing device 204 may interface with the one or more sensors and related devices (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.).

The communication device 202 may further include a communication component to transmit information to and receive information from external sources, including internet, video devices or televisions connected to the present invention.

Figure 5:
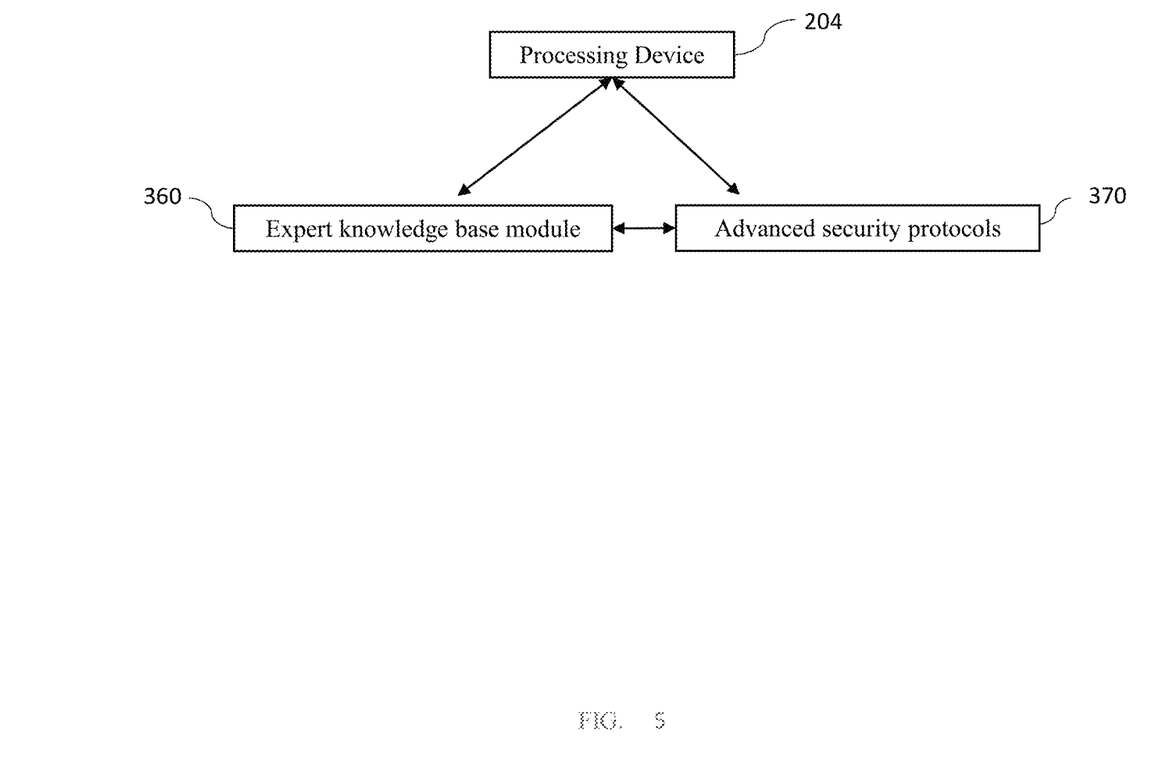
FIG. 5 is an illustration showing the processing device of the present invention connected with the expert knowledge base module and advanced security protocols.

In some embodiments, as shown in FIG. 5, the processing device 204 may be configured to perform diagnosis in communication with and based on an expert knowledge base module 360 and an artificial intelligence module 370 for acquiring a fault recognition algorithm preset by the system for fault types, fault parts and fault degrees of major fault equipment and failure modes of the fault parts in a supervised or unsupervised learning mode, so that an automatic fault distinguishing and classifying function if needed can be provided for monitoring devices (e.g., sensors) included in the communication device 202.

The expert knowledge base module 360 may include data regarding maintenance operation with expert knowledge which can be updated via the communication device 202 (which can obtain information via internet) and, in some embodiments, may provide a maintenance configuration interface, and the user performs operations such as updating and editing on the contents in the expert knowledge base module 360.

The artificial intelligence module 370 can be based on neural networks, pattern recognition, machine learning, genetic algorithms, genetic programming and other artificial intelligence theories to realize signal processing and feature extraction of complex signals, operation state recognition and reliability analysis of the computing device 2600 or similarly complex equipment.

Operation data may include image data from multiple computer components and application. Operation data, in some embodiments, may include sequential temporal data corresponding to observed status of the various computer components of the computing device 2600. As a result, the training data that can be used in the present invention and for a training method may include received sensor data with time-ordered sequences of the extracted performance information (e.g., temporal sequences of observed status of the computing device 2600).

A trained model used in the present invention can be a generative artificial intelligence (AI) model comprising a transformer deep learning neural network.

In some embodiments, the present invention may include a first trained model for training with operation data for finding out faults and a second trained model for training with the operating data after performing the one or more restoration task to repair the faults for finding out proper repairing.

In some embodiments, the storage device 204 may feature a restoration database that comprises a library of restoration (repair) instructions and identification diagrams for various parts and applications. Additionally, the database can facilitate the updating of these parts and applications using predictive algorithms to ensure that updates are consistently maintained. The library of restoration (repair) instructions may include one or more known or predetermined restoration tasks.

Figure 6:
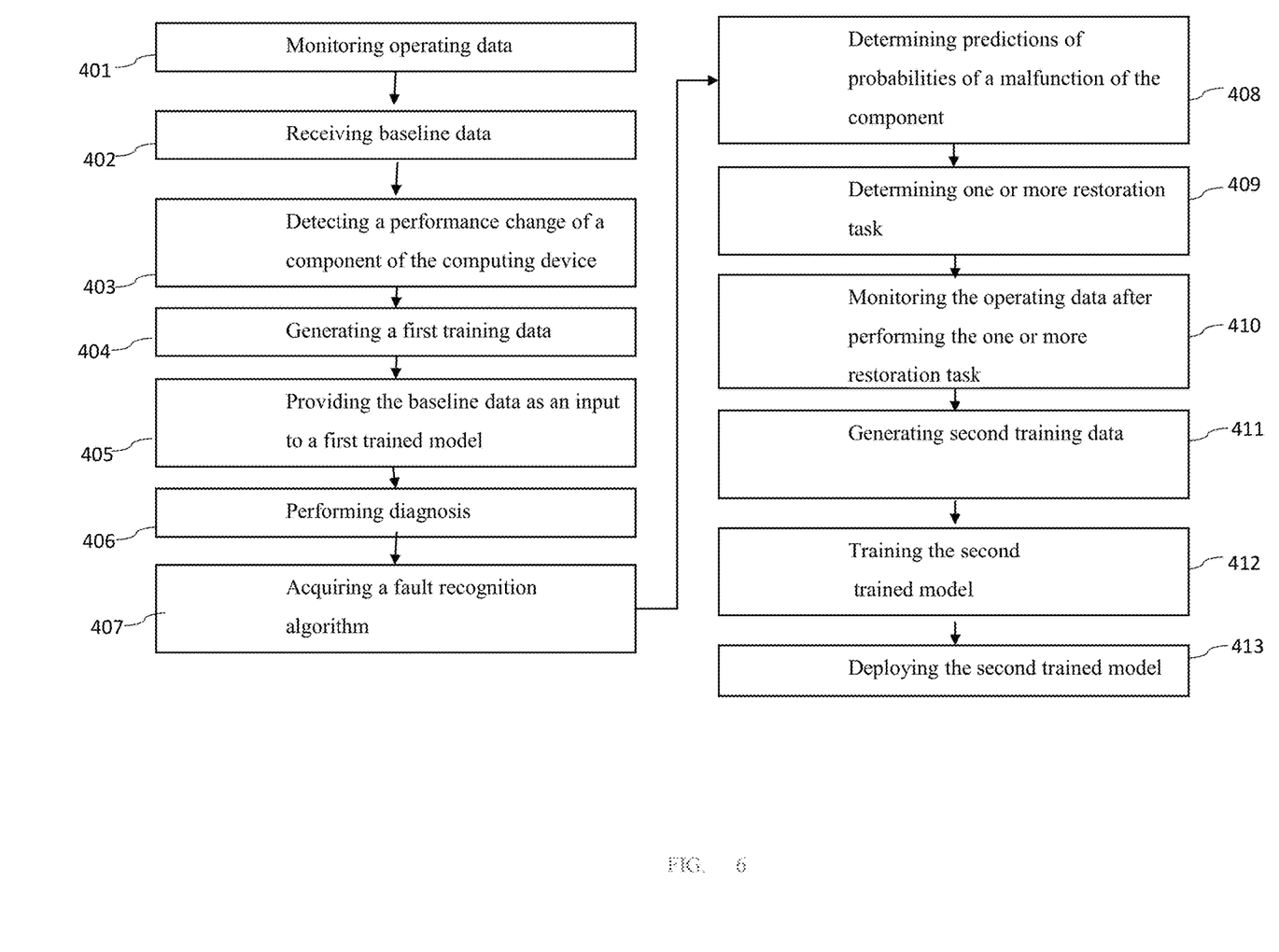
FIG. 6 is an illustration of one embodiment of a method of the present invention.

As shown in FIG. 6, in one embodiment, the present invention provides a method comprising:
monitoring operating data regarding performance of a computing device at 401; receiving baseline data collected at a time when the components of the computer are known to be functioning properly at 402.

The baseline data can be related to a baseline operational use of a computing device. The baseline data may include historical computer usage or functional information from internet or a relevant network.

At 403, the method may include detecting a performance change of a component of the computing device based upon the operating data and the baseline data; at 404, generating a first training data; at 405, providing the baseline data as an input to a first trained model, wherein the first trained model is trained with the first training data; at 406, performing diagnosis based on an expert knowledge base module 360, an artificial intelligence module 370, and the first trained module.

The diagnosis is to find out malfunction of the computer components and may include comparison between the baseline data and the detected performance change of a component of the computing device 2600.

At 407, the method may include acquiring a fault recognition algorithm based on performing diagnosis. The fault recognition algorithm can be preset by the user or the system of the present invention or acquired via internet or a network. In some embodiments, the fault recognition algorithm can be identified by an expert knowledge base module 360 and an artificial intelligence module 370 as described above.

At 408, the method may include determining one or more predictions of probabilities of a malfunction of the component based on the fault recognition algorithm; and at 409, determining one or more restoration task to perform based on the one or more predictions and a restoration database; at 410, monitoring the operating data after performing the one or more restoration task. This step 410 is to check if the issues or fault is fixed by the restoration task.

At 411, the method may include generating second training data based on the monitoring of the operating data. The second training data may include received sensor data with time-ordered sequences of the extracted performance information after performing the restoration task, and information related to success or failure of the restoration task in resolving the problems.

At 412, the method may include training the second trained model with the second training data; and at 411, the method may include deploying the second trained model to a restoration device configured to perform the restoration task.

The restoration devices may include software repair programs, hardware repair devices or warning devices which may be preinstalled in a computing device. The restoration task includes troubleshooting, and repairing the computing device.

Figure 7:
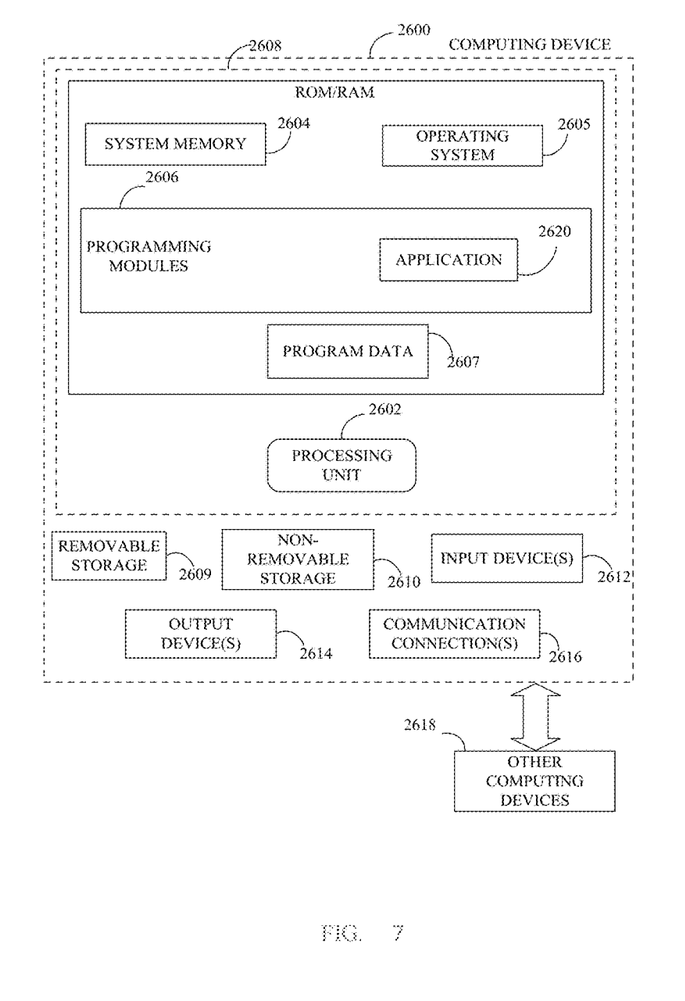
FIG. 7 is a block diagram of a computing device for implementing the methods disclosed herein, in accordance with some embodiments.

In some embodiments, the method may further include generating an avatar for display, wherein the avatar is a computer animated graphical representation with speech recognition and synthesized voices. The computing device 2600 may use the data captured by capture device to generate an avatar. The avatar may be three-dimensional. The computing device 2600 may use movement data captured by capture device to understand movements made by the user and to make the avatar make the same movements as the user, a process that may take place in real-time, with a predetermined delay, or at a later point in time.

The method, in some embodiments, may further include receiving user control input of the avatar, the user control input based on detected movements of the user; converting the user control input into avatar movement; and displaying the avatar with the avatar movement.

In some embodiments, the method may further include providing authentication using advanced security protocols that employ face scans, voice recognition, and ID numbers for user authentication and access control. The authentication may include displaying a question for password and IDs that can be preregistered or any other authentication process known in the art. The method may further include displaying a user interface to supply information to and/or receive information; receiving, via the user interface, a submission requesting to generate and train the second trained model for the restoration task.

In some embodiments, the method may further include providing customization options allowing users to add other primary users with permissions through an approval process. The customization options may include displaying questions regarding number of additional users and user profiles.

In some embodiments, the restoration task may include providing updates and learning mechanisms that enable the program to counter new threats by regularly updating its virus definition database. The updates an be done by replacing the old version to a new version and the learning mechanism can be the usage duration of the old version without updates and historical number of updates to learn update needs.

In some embodiments, the restoration task may include providing security measures that automatically scan documents and websites for safety. The security measures can be providing virus scan software known in the art using the real time internet search or based on the expert knowledge base module, that can be run under the user permissions.

In some embodiments, the restoration task may include providing a backup and recovery system that ensures data integrity and facilitates quick recovery in case of failure. The backup and recovery system can be a backup and recovery software or similar functioning software known in the art.

In some embodiments, the restoration task may include providing energy-efficient modes that conserve power by entering sleep mode and shutting down during periods of inactivity. The energy-efficient modes can be configured to turn on the sleep mode or shut down when computing device is used by an application or the user.

In some embodiments, the method may include updating the library of restoration instructions s with data retrieved from internet and communication with video device and televisions. The library of restoration (repair) instructions may include how the identified problem should be solved by which restoration tasks or which repair software.

In one embodiment, the present invention provides an artificial intelligence apparatus for generating training data, comprising: a memory configured to store a target artificial intelligence model; and a processor configured to perform the method described above.

With reference to FIG. 7, a system consistent with an embodiment of the disclosure may include a computing device or cloud service, such as computing device 2600. In a basic configuration, computing device 2600 may include at least one processing unit 2602 and a system memory 2604. Depending on the configuration and type of computing device, system memory 2604 may comprise, but is not limited to, volatile (e.g. random-access memory (RAM)), non-volatile (e.g. read-only memory (ROM)), flash memory, or any combination. System memory 2604 may include operating system 2605, one or more programming modules 2606, and may include a program data 2607. Operating system 2605, for example, may be suitable for controlling computing device 2600's operation. In one embodiment, programming modules 2606 may include image-processing module, machine learning module, etc. Furthermore, embodiments of the disclosure may be practiced in conjunction with a graphics library, other operating systems, or any other application program and is not limited to any particular application or system. This basic configuration is illustrated in FIG. 7 by those components within a dashed line 2608.

Computing device 2600 may have additional features or functionality. For example, computing device 2600 may also include additional data storage devices (removable and/or non-removable) such as, for example, magnetic disks, optical disks, or tape. Such additional storage is illustrated in FIG. 7 by a removable storage 2609 and a non-removable storage 2610. Computer storage media may include volatile and non-volatile, removable and non-removable media implemented in any method or technology for storage of information, such as computer-readable instructions, data structures, program modules, or other data. System memory 2604, removable storage 2609, and non-removable storage 2610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2600. Any such computer storage media may be part of device 2600. Computing device 2600 may also have input device(s) 2612 such as a keyboard, a mouse, a pen, a sound input device, a touch input device, a location sensor, a camera, a biometric sensor, etc. Output device(s) 2614 such as a display, speakers, a printer, etc. may also be included. The aforementioned devices are examples and others may be used.

Computing device 2600 may also contain a communication connection 2616 that may allow device 2600 to communicate with other computing devices 2618, such as over a network in a distributed computing environment, for example, an intranet or the Internet. Communication connection 2616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2604, including operating system 2605. While executing on processing unit 2602, programming modules 2606 may perform processes including, for example, one or more stages of methods, algorithms, systems, applications, servers, databases as described above. The aforementioned process is an example, and processing unit 2602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A method comprising: monitoring, by a communication device, operating data regarding performance of a computing device; receiving, by a communication device, baseline data collected at a time when components of the computing device are known to be functioning properly; detecting, by a communication device, a performance change of a component of the computing device based upon the operating data and the baseline data; generating a first training data; providing the baseline data as an input to a first trained model, wherein the first trained model is trained with the first training data; perform diagnosis, by using a processing device, based on an expert knowledge base module, an artificial intelligence module, and the first trained module; acquiring a fault recognition algorithm based on performing diagnosis; determining, by a processing device, one or more predictions of probabilities of a malfunction of the component based on the fault recognition algorithm; determining, by a processing device, one or more restoration task to perform based on the one or more predictions and a restoration database; monitoring, by a communication device, the operating data after performing the one or more restoration task; generating second training data based on the monitoring of the operating data; training the second trained model with the second training data; and deploying the second trained model to a restoration device configured to perform the restoration task.

2. The method as claimed in claim 1, the restoration task includes troubleshooting, and repairing the computing device.

3. The method as claimed in claim 2, further includes generating an avatar for display, wherein the avatar is a computer animated graphical representation with speech recognition and synthesized voices; receiving user control input of the avatar, the user control input based on detected movements of the user via a natural user interface executing skeletal tracking to detect the movements of the user at a remote location; converting the user control input into avatar movement; and displaying the avatar with the avatar movement.

4. The method as claimed in claim 3, the restoration task includes providing updates and learning mechanisms that enable the program to counter new threats by regularly updating its virus definition database.

5. The method as claimed in claim 1, further includes providing authentication using advanced security protocols that employ face scans, voice recognition, finger print and ID numbers for user authentication and access control; displaying a user interface to supply information to and/or receive information; and receiving, via the user interface, a submission requesting to generate and train the second trained model for the restoration task.

6. The method as claimed in claim 5, further includes providing customization options allowing users to add other primary users with permissions through an approval process.

7. The method as claimed in claim 1, the restoration task includes providing security measures that automatically scan documents and websites for safety.

8. The method as claimed in claim 7, the restoration task includes providing a backup and recovery system that ensures data integrity and facilitates quick recovery in case of failure.

9. The method as claimed in claim 1, the restoration task includes providing energy-efficient modes that conserve power by entering sleep mode and shutting down during periods of inactivity.

10. The method as claimed in claim 1, the method includes updating the library of algorithms with data retrieved from internet and communication with video device and televisions.

11. An artificial intelligence apparatus for generating training data, comprising: a memory configured to store a target artificial intelligence model; and a processor configured to: monitor, by a communication device, operating data regarding performance of a computing device; receive, by a communication device, baseline data collected at a time when components of the computing device are known to be functioning properly; detect, by a communication device, a performance change of a component of the computing device based upon the operating data and the baseline data; generate a first training data; provide the baseline data as an input to a first trained model, wherein the first trained model is trained with the first training data; perform diagnosis, by using a processing device, based on an expert knowledge base module, an artificial intelligence module, and the first trained module; acquire a fault recognition algorithm based on performing diagnosis; determine, by a processing device, one or more predictions of probabilities of a malfunction of the component based on the fault recognition algorithm; determine, by a processing device, one or more restoration task to perform based on the one or more predictions and a restoration database; monitor, by a communication device, the operating data after performing the one or more restoration task; generate second training data based on the monitoring of the operating data; train the second trained model with the second training data; and deploy the second trained model to a restoration device configured to perform the restoration task.

12. The artificial intelligence apparatus as claimed in claim 11, the restoration task includes troubleshooting, and repairing the computing device.

13. The artificial intelligence apparatus as claimed in claim 12, wherein the processor is configured to generate an avatar for display, wherein the avatar is a computer animated graphical representation with speech recognition and synthesized voices; receive user control input of the avatar, the user control input based on detected movements of the user via a natural user interface executing skeletal tracking to detect the movements of the user at a remote location; convert the user control input into avatar movement; and display the avatar with the avatar movement.

14. The artificial intelligence apparatus as claimed in claim 13, wherein the processor is configured to provide authentication using advanced security protocols that employ face scans, voice recognition, and ID numbers for user authentication and access control; display a user interface to supply information to and/or receive information; and receive, via the user interface, a submission requesting to generate and train the second trained model for the restoration task.

15. The artificial intelligence apparatus as claimed in claim 14, wherein the processor is configured to provide customization options allowing users to add other primary users with permissions through an approval process.

16. The artificial intelligence apparatus as claimed in claim 13, the restoration task includes providing updates and learning mechanisms that enable the program to counter new threats by regularly updating its virus definition database.

17. The artificial intelligence apparatus as claimed in claim 11, the restoration task includes providing security measures that automatically scan documents and websites for safety.

18. The artificial intelligence apparatus as claimed in claim 17, the restoration task includes providing a backup and recovery system that ensures data integrity and facilitates quick recovery in case of failure.

19. The artificial intelligence apparatus as claimed in claim 18, the restoration task includes providing energy-efficient modes that conserve power by entering sleep mode and shutting down during periods of inactivity.

20. The artificial intelligence apparatus as claimed in claim 19, wherein the processor is configured to update a library of algorithms with data retrieved from internet and communication with video device and televisions.

* * * * *